(12) United States Patent
Heil et al.

(10) Patent No.: US 9,828,044 B2
(45) Date of Patent: Nov. 28, 2017

(54) FEEDBACK CONTROL OF VEHICLE AERODYNAMICS

(71) Applicant: GM GLOBAL TECHNOLOGY OPERATIONS LLC, Detroit, MI (US)

(72) Inventors: Edward T. Heil, Howell, MI (US); Jason S. Rhee, Canton, MI (US); Hualin Tan, Novi, MI (US); Joshua R. Auden, Brighton, MI (US); Jason D. Fahland, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/093,071

(22) Filed: Apr. 7, 2016

(65) Prior Publication Data

US 2017/0088200 A1    Mar. 30, 2017

Related U.S. Application Data

(60) Provisional application No. 62/232,944, filed on Sep. 25, 2015.

(51) Int. Cl.
*B60W 10/00* (2006.01)
*B62D 37/02* (2006.01)
*B62D 35/00* (2006.01)

(52) U.S. Cl.
CPC ........... *B62D 37/02* (2013.01); *B62D 35/005* (2013.01); *B62D 35/007* (2013.01)

(58) Field of Classification Search
None
See application file for complete search history.

(56) References Cited

U.S. PATENT DOCUMENTS

| | | | |
|---|---|---|---|
| 5,566,745 A * | 10/1996 | Hill | B61C 5/02 105/62.2 |
| 6,170,274 B1 * | 1/2001 | Ichishi | B60H 1/345 236/49.3 |
| 6,170,904 B1 * | 1/2001 | Schaedlich | B62D 35/007 180/903 |
| 6,196,620 B1 * | 3/2001 | Haraway, Jr. | B62D 35/007 180/903 |
| 6,447,049 B1 * | 9/2002 | Tohda | B60R 19/12 293/117 |

(Continued)

*Primary Examiner* — Jonathan M Dager
(74) *Attorney, Agent, or Firm* — Quinn IP Law

(57) ABSTRACT

A system is configured to control aerodynamics of a vehicle. The vehicle includes a body having a front end facing oncoming ambient airflow. The system includes a vehicle control device for receiving operator input to command a target vehicle dynamic response. A vehicle subsystem adjusts an actual vehicle dynamic response to the operator input. The system also includes an adjustable aerodynamic-aid element and a mechanism for varying the element's position to control movement of the airflow relative to the vehicle. At least one sensor detects the adjusted actual vehicle dynamic response and communicates a feedback signal indicative of the detected vehicle dynamic response to a controller. The controller also determines a target position for the aerodynamic-aid element using the detected adjusted actual vehicle dynamic response and regulates the aerodynamic-aid element to its target position via the mechanism to control the aerodynamics and achieve the target dynamic response of the vehicle.

20 Claims, 3 Drawing Sheets

(56) References Cited

U.S. PATENT DOCUMENTS

| | | | | |
|---|---|---|---|---|
| 7,201,432 B2* | 4/2007 | Roth | B62D 35/007 | 296/180.5 |
| 7,263,419 B2* | 8/2007 | Wheals | B60T 8/172 | 701/36 |
| 7,607,718 B2* | 10/2009 | Schwan | B62D 35/007 | 296/180.5 |
| 7,665,796 B2* | 2/2010 | Wegener | B62D 35/007 | 180/903 |
| 7,770,962 B1* | 8/2010 | Maxwell | B62D 35/007 | 296/180.5 |
| 7,841,646 B2* | 11/2010 | Paul | B62D 35/007 | 296/180.1 |
| 8,439,276 B2* | 5/2013 | Prior | B60K 11/085 | 123/41.04 |
| 8,452,504 B2* | 5/2013 | Dickinson | F16H 48/32 | 180/65.28 |
| 8,833,313 B2* | 9/2014 | Lockwood | B60K 11/085 | 123/41.04 |
| 9,333,994 B1* | 5/2016 | Fahland | B62D 35/007 | |
| 9,381,957 B1* | 7/2016 | Auden | B62D 35/007 | |
| 9,540,057 B2* | 1/2017 | Jeong | G01G 19/12 | |
| 9,580,118 B2* | 2/2017 | Cardile | B62D 35/007 | |
| 9,718,470 B2* | 8/2017 | Naab | B60W 30/16 | |
| 2001/0052717 A1* | 12/2001 | Yoon | B62D 35/007 | 296/180.1 |
| 2003/0101947 A1* | 6/2003 | Ries-Mueller | F01P 7/12 | 123/41.05 |
| 2003/0105563 A1* | 6/2003 | Oshima | B60L 15/2036 | 701/22 |
| 2003/0200016 A1* | 10/2003 | Spillane | B60G 17/0195 | 701/36 |
| 2004/0226764 A1* | 11/2004 | Iwasaki | F01P 3/20 | 180/68.1 |
| 2004/0238246 A1* | 12/2004 | Ceccarani | B60K 13/02 | 180/68.1 |
| 2005/0004732 A1* | 1/2005 | Berry | B60W 10/06 | 701/48 |
| 2005/0029035 A1* | 2/2005 | Shigeta | B60K 23/0808 | 180/248 |
| 2005/0203684 A1* | 9/2005 | Borgesson | B60K 35/00 | 701/36 |
| 2005/0206234 A1* | 9/2005 | Tseng | B60G 17/0162 | 303/146 |
| 2006/0095178 A1* | 5/2006 | Guilfoyle | B60K 11/085 | 701/36 |
| 2006/0102399 A1* | 5/2006 | Guilfoyle | B60K 11/04 | 180/68.1 |
| 2007/0145776 A1* | 6/2007 | Grave | B62D 35/007 | 296/180.5 |
| 2007/0265749 A1* | 11/2007 | Fitzgibbons | B60G 17/0195 | 701/37 |
| 2008/0116717 A1* | 5/2008 | Honeycutt | B62D 37/02 | 296/180.5 |
| 2010/0083917 A1* | 4/2010 | Saida | B60K 11/085 | 123/41.04 |
| 2011/0005851 A1* | 1/2011 | Doroghazi | B60K 11/085 | 180/68.1 |
| 2011/0118945 A1* | 5/2011 | Mochizukii | B60K 11/085 | 701/49 |
| 2011/0137530 A1* | 6/2011 | Kerns | F01P 7/10 | 701/49 |
| 2011/0148143 A1* | 6/2011 | Ondracek | B62D 35/008 | 296/180.5 |
| 2011/0246023 A1* | 10/2011 | Lockwood | F01P 7/10 | 701/36 |
| 2012/0074729 A1* | 3/2012 | Fenchak | B60K 11/085 | 296/193.1 |
| 2012/0318476 A1* | 12/2012 | Begleiter | B60T 5/00 | 165/51 |
| 2013/0046445 A1* | 2/2013 | Nishimura | B60H 1/3208 | 701/49 |
| 2013/0095740 A1* | 4/2013 | Hori | B60K 11/085 | 454/152 |
| 2013/0184943 A1* | 7/2013 | Sato | B60H 1/00978 | 701/49 |
| 2013/0221701 A1* | 8/2013 | De Luca | B62D 37/02 | 296/180.5 |
| 2013/0223980 A1* | 8/2013 | Pastrick | B60K 11/085 | 415/1 |
| 2013/0226414 A1* | 8/2013 | De Luca | B62D 37/02 | 701/49 |
| 2013/0247862 A1* | 9/2013 | Sakai | B60K 11/085 | 123/188.1 |
| 2013/0248266 A1* | 9/2013 | Asano | B60K 11/04 | 180/68.1 |
| 2013/0252531 A1* | 9/2013 | Asano | B60K 11/085 | 454/155 |
| 2013/0255603 A1* | 10/2013 | Pursifull | F01P 11/16 | 123/41.15 |
| 2013/0255604 A1* | 10/2013 | Rollinger | F01P 7/048 | 123/41.15 |
| 2013/0255605 A1* | 10/2013 | Jentz | F01P 11/16 | 123/41.15 |
| 2013/0268164 A1* | 10/2013 | Sugiyama | B60K 11/085 | 701/49 |
| 2013/0275009 A1* | 10/2013 | Sakai | B60K 11/085 | 701/49 |
| 2013/0338870 A1* | 12/2013 | Farmer | B60K 11/085 | 701/29.2 |
| 2014/0005896 A1* | 1/2014 | Hirota | B60K 11/085 | 701/49 |
| 2014/0005897 A1* | 1/2014 | Hayakawa | B60K 11/085 | 701/49 |
| 2014/0026831 A1* | 1/2014 | Mahrs | F01P 7/04 | 123/41.05 |
| 2014/0039765 A1* | 2/2014 | Charnesky | B60K 11/085 | 701/49 |
| 2014/0129088 A1* | 5/2014 | Meissner | B60W 10/04 | 701/41 |
| 2014/0230760 A1* | 8/2014 | Okamoto | F01P 7/026 | 123/41.05 |
| 2014/0271192 A1* | 9/2014 | Brooks | F03D 7/022 | 416/23 |
| 2014/0273806 A1* | 9/2014 | Frayer, III | B60K 11/085 | 454/335 |
| 2014/0273807 A1* | 9/2014 | Frayer, III | B60K 11/085 | 454/335 |
| 2014/0288788 A1* | 9/2014 | Hayakawa | B60K 11/085 | 701/49 |
| 2014/0290599 A1* | 10/2014 | Numata | F01P 7/10 | 123/41.05 |
| 2014/0370795 A1* | 12/2014 | Klop | B60H 1/242 | 454/75 |
| 2015/0081170 A1* | 3/2015 | Kikuchi | B60G 17/018 | 701/37 |
| 2015/0127200 A1* | 5/2015 | Takeuchi | B60W 10/04 | 701/22 |
| 2015/0210290 A1* | 7/2015 | Hemes | B60W 50/082 | 701/36 |
| 2016/0052513 A1* | 2/2016 | Ishiba | B60W 30/02 | 701/41 |
| 2016/0304139 A1* | 10/2016 | Handzel, Jr. | B62D 35/007 | |
| 2017/0080770 A1* | 3/2017 | Irwin | B60G 17/0165 | |
| 2017/0080948 A1* | 3/2017 | Lubbers | B60W 40/09 | |
| 2017/0088106 A1* | 3/2017 | Fahland | B60T 8/1766 | |
| 2017/0088192 A1* | 3/2017 | Auden | B62D 35/00 | |
| 2017/0088194 A1* | 3/2017 | Heil | B62D 35/00 | |
| 2017/0137026 A1* | 5/2017 | Hemes | B60W 30/182 | |

* cited by examiner

FEEDBACK CONTROL OF VEHICLE AERODYNAMICS

CROSS-REFERENCE TO RELATED APPLICATION(S)

This application claims the benefit of U.S. Provisional Application Ser. No. 62/232,944 filed Sep. 25, 2015, the entire content of which is hereby incorporated by reference.

TECHNICAL FIELD

The disclosure relates to feedback control of vehicle aerodynamics.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds.

The study is typically used to shape vehicle bodywork along with employing dedicated aerodynamic devices for achieving a desired compromise among the above characteristics for specific vehicle use. Additionally, the study of aerodynamics may also be used to achieve downforce in vehicles in order to improve vehicle traction, high speed stability, and cornering.

SUMMARY

A system is configured to control aerodynamics of a vehicle. The vehicle includes a vehicle body arranged along a longitudinal axis and having a front end configured to face oncoming ambient airflow. The system includes a vehicle control device configured to receive operator input for commanding a target dynamic response, such as handling, of the vehicle. The system also includes a vehicle subsystem configured to adjust an actual dynamic response of the vehicle to the operator input. The system additionally includes an adjustable aerodynamic-aid element mounted to the vehicle body, a mechanism configured to vary a position of the adjustable aerodynamic-aid element relative to the vehicle body and thereby control a movement of the ambient airflow relative to the vehicle body, and at least one sensor arranged on the vehicle and configured to detect the actual dynamic response of the vehicle adjusted by the vehicle subsystem. The system also includes a controller programmed to regulate the mechanism. The controller is configured to receive a feedback signal from the at least one sensor indicative of the detected adjusted actual dynamic response of the vehicle. The controller is also configured to determine a target position for the adjustable aerodynamic-aid element using the detected adjusted actual dynamic response of the vehicle, and regulate the adjustable aerodynamic-aid element to the target position thereof via the mechanism to control the aerodynamics and achieve the target dynamic response of the vehicle.

The controller may be additionally configured to regulate the vehicle subsystem to facilitate the target dynamic response of the vehicle.

The vehicle subsystem may be one of an electronic limited-slip differential, an electric all-wheel-drive, a traction control subsystem, a stability control subsystem, an active rear steer subsystem, a ride-height control subsystem, a spring rate control subsystem, a damping control subsystem, and an anti-lock braking subsystem.

The vehicle may include a road wheel. The detected adjusted actual dynamic response of the vehicle may be yaw of the vehicle body. Additionally, the at least one sensor may be selected from a first sensor configured to detect a rotating speed of the road wheel and communicate the detected rotating speed of the road wheel to the controller; a second sensor configured to detect a rate of the yaw of the vehicle body and communicate the detected yaw rate to the controller; and a third sensor configured to detect a velocity of ambient airflow relative to the vehicle and communicate the detected velocity of the ambient airflow to the controller.

The vehicle control device may be a steering wheel. In such a case, the at least one sensor may also include a fourth sensor configured to detect an angle of the steering wheel and communicate the detected angle of the steering wheel to the controller.

The controller may be configured to regulate the mechanism to achieve the target dynamic response of the vehicle during vehicle cornering in response to the detected yaw rate and at least one of the detected rotating speed of the road wheel and velocity of the ambient airflow. Such regulation of the mechanism is intended to vary a magnitude of an aerodynamic downforce on the vehicle body and control the detected yaw rate.

The vehicle may include a second vehicle body end opposite the first body end. The aerodynamic-aid element may be positioned either proximate the first body end or the second body end. As such, the controller may be configured to vary the magnitude of the aerodynamic downforce generated by the aerodynamic-aid element on either the first vehicle body end or the second vehicle body end via regulation of the mechanism.

The mechanism may include at least one of a linear actuator, a rotary actuator, and an electric motor. While the aerodynamic-aid element may be one of an adjustable spoiler, an air dam, a splitter, a diffuser, and shutter having rotatable louvers.

A vehicle employing the above-described system and a method of controlling aerodynamics of such a vehicle are also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
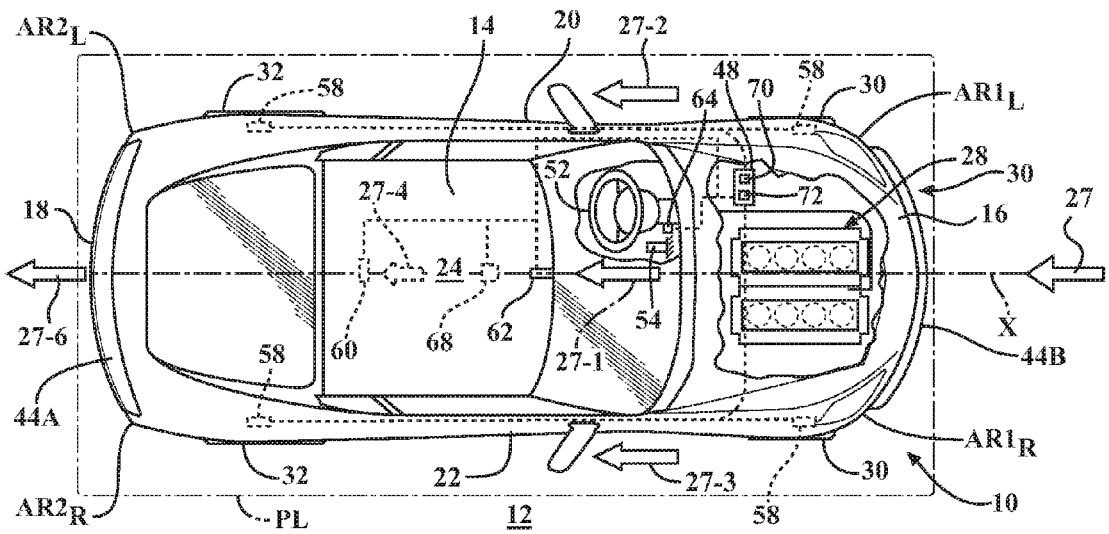
FIG. 1 is a schematic top view of a vehicle having a vehicle body arranged in a body plane and along a longitudinal axis, and having a plurality of adjustable aerodynamic-aid elements and various sensors mounted to the vehicle body for detection of vehicle dynamic response according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane P that is substantially parallel to the road surface 12. The vehicle body 14 defines six body sides. The six body sides include a first body end or front end 16, a second body end or rear end 18 arranged opposite the front end, a first lateral body side or left side 20, and a second lateral body side or right side 22, a top body portion 24, which may include a vehicle roof, all shown in FIG. 1, and an underbody portion 26, shown in FIG. 3.

The left side 20 and right side 22 are disposed generally parallel to each other and with respect to the longitudinal axis X, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in phantom in FIG. 1) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14

Figure 2:
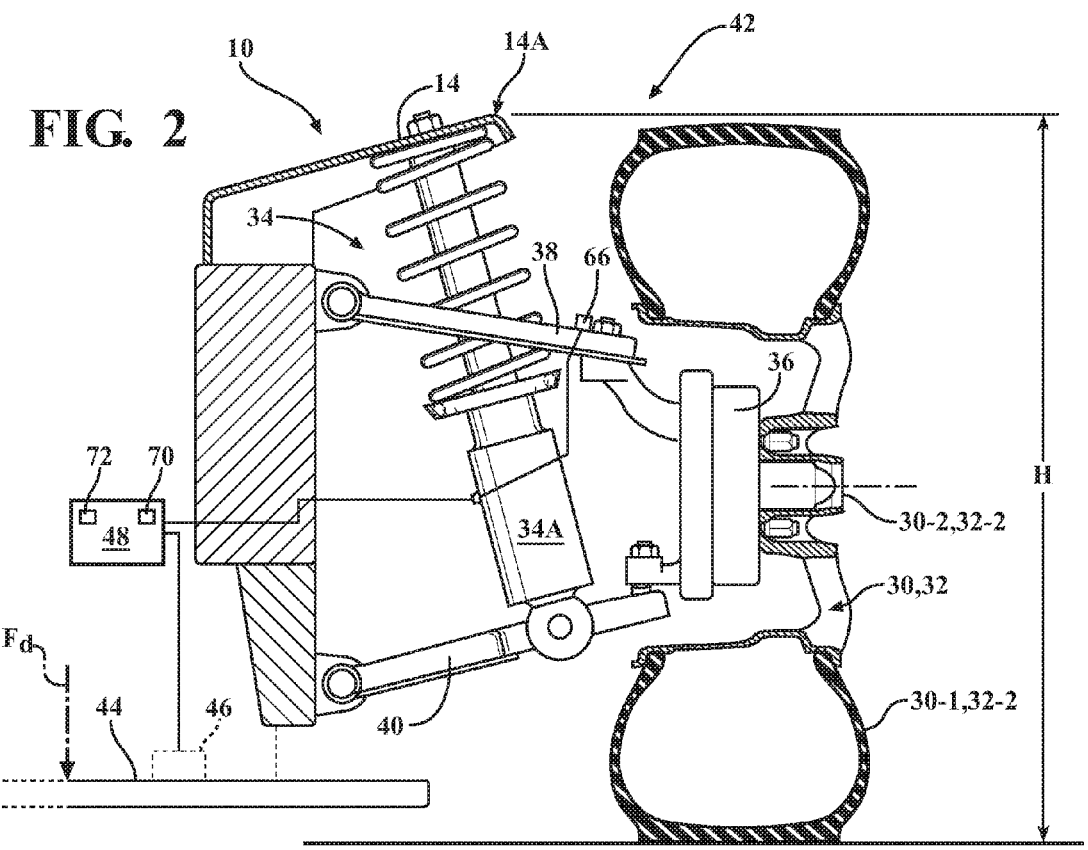
FIG. 2 is an enlarged schematic cross-sectional illustration of a representative suspension corner of the vehicle shown in FIG. 1 according to the disclosure.

The vehicle 10 also includes a plurality of road wheels that include front wheels 30 and rear wheels 32. The vehicle 10 may be configured such that any or each of the road wheels 30, 32 is driven, i.e., receives torque input from the powerplant 28, for propelling the vehicle. As shown, each road wheel 30, 32 may have a pneumatic tire mounted thereon. Specifically, in the case of the four wheeled vehicle 10 shown, a pair of front wheels 30 arranged proximate the front end 16 and a pair of rear wheels 32 arranged proximate the rear end 18, include front tires 30-1 and rear tires 32-1 mounted on the respective front and rear wheels. Although four wheels, i.e., a pair of front wheels 30 and a pair of rear wheels 32, are shown in FIG. 1, a vehicle with fewer or greater number of wheels is also envisioned. As shown in FIG. 2, a vehicle suspension system, indicated generally at 34, operatively connects the body 14 to the front and rear wheels 30, 32 for maintaining contact between the wheels and a road surface 12, and for maintaining handling of the vehicle.

The suspension system 34 includes a plurality of knuckles 36, each configured to support a respective road wheel 30, 32 via a wheel hub 30-2, 32-2 and a bearing assembly (not shown). As shown, each knuckle 36 may be operatively connected to the body 14 via an upper control arm 38 and a lower control arm 40. FIG. 2 depicts a representative corner 42 existing at each left and right front road wheel 30 and left and right rear road wheel 32 of the suspension system 34, each of which includes a representative knuckle 36, and may include each of the control arms 38 and 40. Other suspension designs employing individual corners at specific road wheels are known to those skilled in the art, and are also envisioned. As shown, the vehicle 10 can be characterized by a vehicle ride-height, which specifies a vertical position of the vehicle body 14 with respect to a selected fixed frame of reference. For example, as shown in FIG. 2, vehicle ride-height can be defined as a height H of the vehicle body 14 relative to the road surface 12.

The vehicle 10 also includes an adjustable aerodynamic-aid element generically shown and identified via a numeral 44 in FIG. 2. The adjustable aerodynamic-aid element 44 is mounted to the vehicle body 14. The adjustable aerodynamic-aid element 44 can, for example, take the form of an adjustable-position spoiler 44A (shown in FIGS. 1 and 3), an adjustable-position splitter 44B (shown in FIGS. 1 and 3), an extendible air dam 44C (shown in FIG. 4), an adjustable-position diffuser 44D (shown in FIG. 3), or a variable-position shutter 44E (shown in FIG. 3) having moveable louvers 44E-1 that can be shifted between opened and closed positions. As such, the adjustable aerodynamic-aid element 44 can be positioned either on the front end 16 or the rear end 18 of the vehicle 10. Each aerodynamic-aid element 44 can be adjusted relative to the vehicle body 14 via a respective mechanism 46. The mechanism 46 is configured to vary a position of the adjustable aerodynamic-aid element 44 relative to the vehicle body 14. Such variation of the position of the respective aerodynamic-aid element 44 is configured to control a movement of the ambient airflow 27 relative to the vehicle body 14 and can vary a downforce FD generated by the airflow thereon. The downforce FD is also known by those skilled in the art as the aerodynamic force applied to the vehicle body 14 that acts in a direction normal to the body plane P and counters lift of the vehicle body at elevated road speeds. Each mechanism 46 can include an electric motor or another type of an actuator, as will be described in more detail below.

As shown in FIGS. 1-4, the vehicle also includes an electronic controller 48 configured, i.e., constructed and programmed, to regulate the mechanism 46. The controller 48 may be configured as a central processing unit (CPU) configured to regulate operation of the powerplant 28, or a dedicated controller. In order to appropriately control operation of the mechanism 46, the controller 48 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 48 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 48 may also include a floppy disk, a flexible disk, hard disk, magnetic tape, any other magnetic medium, a CD-ROM, DVD, any other optical medium, etc. The controller 48 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 48 or accessible thereby may be stored in the memory and automatically executed to provide the required functionality.

As shown in FIG. 1, the vehicle 10 also includes a vehicle control device configured to receive operator input for commanding a target dynamic response 50 of the vehicle 10. The vehicle control device can be a steering wheel 52 arranged inside the passenger compartment of the vehicle 10. The vehicle control device can also be an accelerator pedal, lever, or any other mechanism 54 permitting the vehicle operator to command generation of input torque by the powerplant 28. The vehicle 10 also includes a vehicle subsystem 56 configured to adjust an actual dynamic response or handling of the vehicle 10 consistent with the command(s) generated via operator input to the respective vehicle control device, such as the representative control devices 52 and/or 54.

Figure 3:
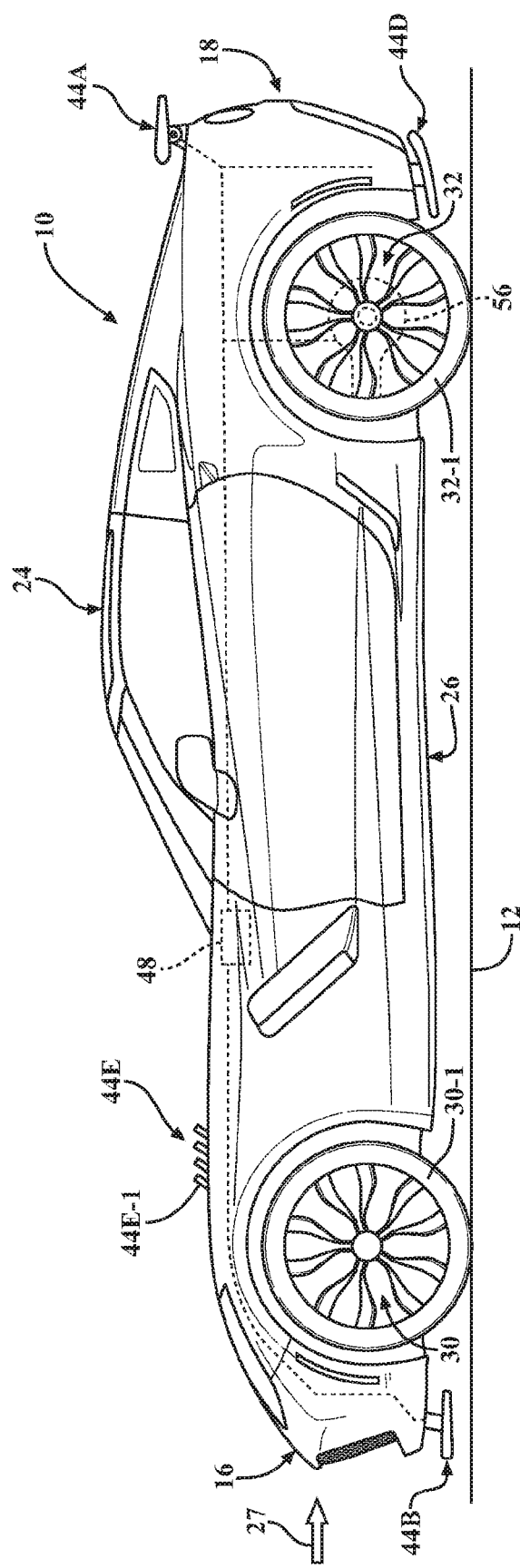
FIG. 3 is a schematic side view of the vehicle shown in FIG. 1 according to the disclosure.

The vehicle subsystem 56 can be configured as an electronic limited-slip differential, which is shown in FIG. 3 as arranged between driven road wheels 32 but may also be arranged between the driven wheels 30. The vehicle subsystem 56 can also be configured as an electric all-wheel-drive (not shown), wherein all the road wheels can be selectively driven, for example the front wheels 30 via an internal combustion engine and the rear wheels 32 via an electric motor. Additionally, the vehicle subsystem 56 can be configured as a traction control mechanism, which regulates the amount of input torque from the powerplant 28 applied at the driven wheels 30 and/or 32, and/or an anti-lock braking system (not shown) configured to control application of friction brakes at the road wheels 30, 32. The vehicle subsystem 56 can additionally be configured as a stability control mechanism (not shown), which can regulate input torque from the powerplant 28 and/or braking forces applied at the driven wheels 30 and/or 32.

The vehicle subsystem 56 can also be configured as an active rear steer mechanism (not shown) capable of regulating an angle of rotation of rear road wheels 32, and/or a ride-height control provided to regulate the height H of the vehicle body 14 relative to the road surface 12 via specifically configured actuators 34A (shown in FIG. 2). The vehicle subsystem 56 can also be configured as a spring rate and/or a damping control mechanism that is part of the suspension system 34. The controller 48 can be additionally configured to regulate any and all of the vehicle subsystems 56 described above to facilitate the target dynamic response of the vehicle 10. Although the majority of the representative vehicle subsystem 56 described above are not shown in the Figures, those skilled in the art will readily envision such subsystems.

Figure 4:
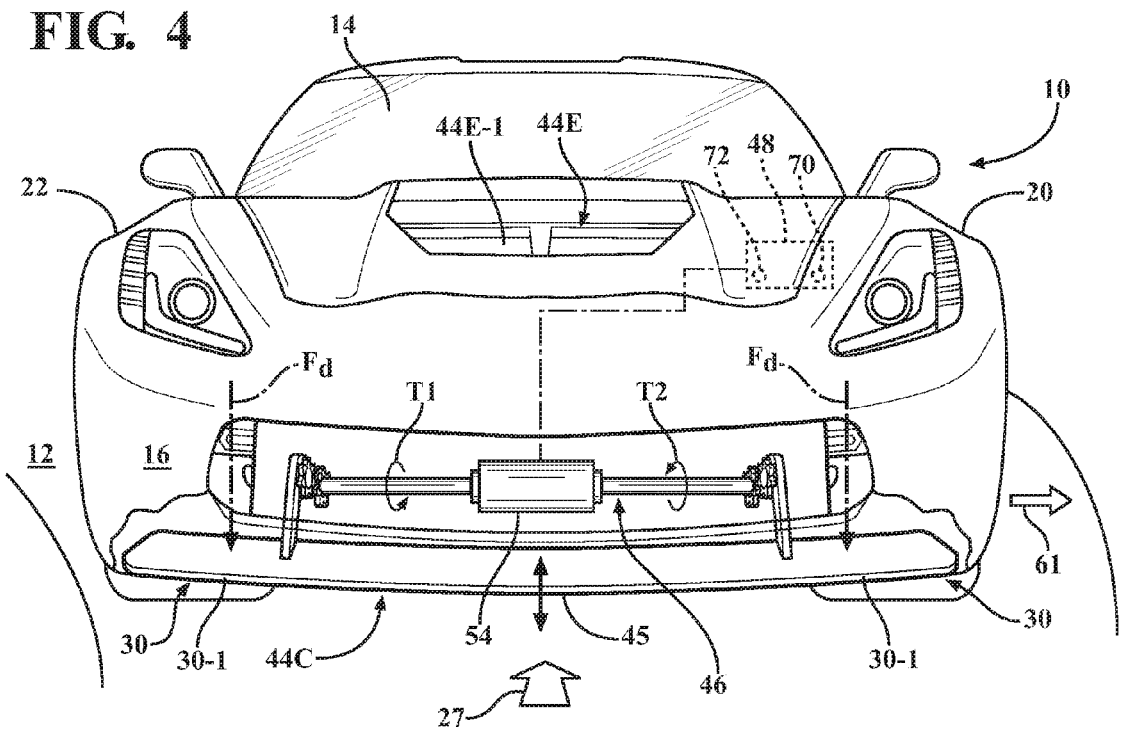
FIG. 4 is a schematic partial cut-away front view of the vehicle shown in FIG. 1, illustrating vehicle yaw according to the disclosure.

The controller 48 is configured to regulate each mechanism 46 to thereby vary the position of the respective adjustable aerodynamic-aid element 44 relative to the vehicle body 14. Each mechanism 46 may include a suitable device for generating movement of the aerodynamic-aid element 44, such as a linear actuator and/or an electric motor (not shown, but understood by those skilled in the art). The mechanism 46 may also include a gear drive, such as a reduction gear-set, which may be coupled to the device, such as the linear actuator or electric motor, in order to affect desired movement of the aerodynamic-aid element 44 relative to the vehicle body 14. For example, as shown in FIG. 4, the particular mechanism 46 may be configured to apply a torque T1 to change position of the air dam 44C in one direction, for example to lower the air dam, and an opposite torque T2 to shift the air dam in the opposite direction. Similar principle of actuation may be applied to other aerodynamic-aid elements 44 via respective mechanisms 46.

The vehicle 10 additionally includes at least one sensor arranged on the vehicle and configured to detect the actual dynamic response of the vehicle to the operator commands. Accordingly, such sensors would also be configured to detect actual dynamic response of the vehicle 10 after the vehicle response was adjusted via one or more of the vehicle subsystems 56 discussed above. Such sensors may include a plurality of first sensors 58 arranged on the vehicle body 14 for detecting rotating speeds of each road wheel 30, 32 (shown in FIG. 2). Each first sensor 58 may also be configured to communicate the detected rotating speed of the respective road wheel 30, 32 as a specific feedback signal to the controller 48, while the controller may be configured to correlate the signals received from the respective first sensors to road speed of the vehicle 10. The vehicle 10 may also include a second sensor 60 (shown in FIG. 2) configured to detect a moment or rate of yaw 61 of the vehicle body 14 relative to the road surface 12 and communicate the detected yaw rate as a specific feedback signal to the controller 48.

The vehicle 10 may additionally include a third sensor 62 (shown in FIG. 1) configured to detect a velocity of ambient airflow 27 relative to the vehicle 10 and communicate the detected velocity of the ambient airflow as a specific feedback signal to the controller 48. The third sensor 62 may be a pitot tube configured to detect a pressure of the ambient airflow 27 at a specific location relative to the vehicle body 14, and the controller 48 can correlate the measured pressure to airflow velocity. Additionally, the vehicle 10 may include a fourth sensor 64 operatively connected to the steering wheel 52 (shown in FIG. 1) and configured to identify an intended direction of the vehicle and communicate the detected intended direction as a specific feedback signal to the controller 48. Additionally, sensors configured to detect the adjusted dynamic response of the vehicle 10 may also include one or more height or chassis position sensors 66 arranged on the vehicle body 14 and configured to detect a ride-height H of the vehicle body 14 relative to the road surface 12. Additional sensors configured to detect the adjusted dynamic response of the vehicle 10 may also include accelerometer(s) 68 to detect longitudinal forces, such as encountered during acceleration or braking maneuvers, as well as lateral g-forces acting on the vehicle 10.

Accordingly, the controller 48 is also configured to receive the respective feedback signal(s) indicative of the detected adjusted actual dynamic response of the vehicle 10 from at least one of the sensors, such as the sensors 58, 60, 62, 64, 66, and 68. Following receiving the respective feedback signal(s) from at least one of the above sensors, the controller 48 determines or calculates the actual vehicle response after such was adjusted via one or more of the vehicle subsystems 56 discussed above. Such a determination of actual vehicle response can be based on empirical data or a mathematical model programmed into the controller 48, which will take into account current operating condition(s) of the subject vehicle subsystem(s) 56. Additionally, the controller 48 is configured to determine a target position 70 for each employed adjustable aerodynamic-aid element 44 using the detected adjusted actual dynamic response of the vehicle 10. Furthermore, the controller 48 is configured to set the appropriate adjustable aerodynamic-aid element 44 to its target position 70 via the mechanism 46 to control the aerodynamics and aid handling of the vehicle 10. Such control of vehicle aerodynamics can aid in maintaining the vehicle 10 on an intended path by countering the various forces acting on the vehicle body 14 and achieve the target dynamic response of the vehicle.

For example, the target position 70 for each of the spoiler 44A arranged proximate the front end 16 and the splitter 44B arranged proximate the rear end 18 can include target values for respective angles θ of the spoiler 44A and the splitter 44B relative to the vehicle body 14 and the road surface 12. Such target values for the angle θ of the spoiler 44A and the splitter 44B can be employed during cornering of the vehicle 10 in response to the yaw rate detected by the second sensor 60. Furthermore, the controller 48 may be configured to set the target angle θ in response to the rotating speeds of the road wheels 30, 32 detected via the first sensor 58 and/or the velocity of the ambient airflow 27 detected via the third sensor 62. Accordingly, the target angle θ of the respective aerodynamic-aid element 44 can be set proportionately to the yaw rate generated and detected during cornering of the vehicle 10. The controller 48 may be programmed with a look-up table 72 establishing correspondence between the vehicle yaw rate, vehicle road speed, and/or velocity of the airflow and target angle θ for each of the spoiler 44A and the splitter 44B to thereby affect appropriate regulation of the mechanism 46. The look-up table 72 may be developed empirically during validation and testing of the vehicle 10.

As the angle θ of the specific aerodynamic-aid element 44 is adjusted during the cornering event, a magnitude of the downforce FD generated by the subject aerodynamic-aid element on the vehicle body 14 is also varied. For example, the splitter 44B positioned at the front end 16 is able to use the ambient airflow 27 more effectively to maximize the downforce FD at the front end of the vehicle body 14 for limiting vehicle understeer. Similarly, the spoiler 44A positioned at the rear end 18 is able to use the ambient airflow 27 more effectively during the cornering event to maximize the downforce FD at the rear end of the vehicle body 14 for limiting vehicle oversteer.

The controller 48 may be additionally programmed to determine a slip of the vehicle 10 relative to the road surface 12. The slip of the vehicle 10 may include a measure of how much each of the tires 30-1, 32-1 has slipped in a direction that is generally perpendicular to the longitudinal vehicle axis X, which identifies that the vehicle has deviated from an intended direction or path along the road surface 12. As noted above, the intended direction of the vehicle 10 may be identified by the steering wheel angle, which can be detected by the fourth sensor 64 operatively connected to the steering wheel 52 (shown in FIG. 1) and communicated to the controller 48.

Furthermore, the controller 48 may be programmed to compare the steering wheel angle detected by the fourth sensor 64 and the yaw rate detected by the second sensor 60 to assess how much the vehicle has deviated from its intended direction or path.

As the position of the particular aerodynamic-aid element 44 is varied during acceleration, braking, and/or cornering events, the aerodynamic-aid element positioned either at the front end 16, the rear end 18, or elsewhere on the vehicle body 14, is able to utilize the ambient airflow 27 for controlling the downforce FD on the vehicle body 14. Such control of the downforce FD, in turn, affects dynamic behavior, i.e., response of the vehicle 10 and enhances vehicle's stability. Accordingly, the controller 48 regulates the respective mechanism(s) 46 to achieve the target dynamic response of the vehicle 10 during acceleration, braking, and/or cornering events, in response to the detected yaw rate and at least one of the detected rotating speed of the road wheels 30, 32 and velocity of the ambient airflow 27. As a result, the controller 48 varies the magnitude of an aerodynamic downforce FD on the vehicle body 14 and controls the detected yaw rate.

The controller 48 may also be programmed to control the slip of the vehicle 10 relative to the road surface 12 by controlling the position of the specific aerodynamic-aid element 44 via the respective mechanism 46 in response to how much the vehicle has deviated from its intended path. The employed shift of the respective aerodynamic-aid element 44 then urges the vehicle 10 to return the actual vehicle heading to the desired heading being commanded by an operator of the vehicle at the steering wheel 52. Accordingly, target position of the specific aerodynamic-aid element 44 may be employed to maintain contact of the vehicle 10 with the road surface 12 at elevated speeds by countering aerodynamic lift of the vehicle body 14 in response to the velocity of ambient airflow 27 detected by the third sensor 62. Overall, as with the above example of controlling vehicle yaw rate during cornering, the determined target position of the aerodynamic-aid element 44 may be employed to achieve a target dynamic response of the vehicle 10 via varying a magnitude of the downforce FD on the vehicle body 14.

Figure 5:
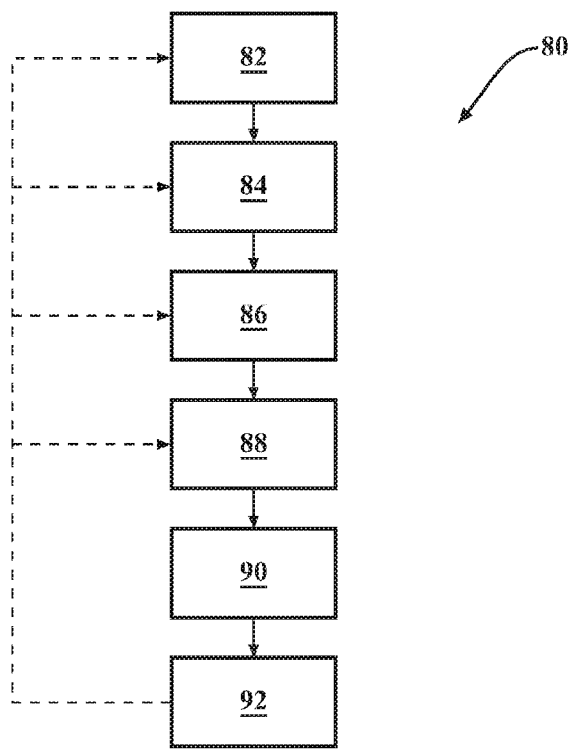
FIG. 5 is a flow chart illustrating a method of controlling aerodynamics of a vehicle according to the present disclosure.

FIG. 5 depicts a method 80 of controlling aerodynamics of the vehicle 10 as described above with respect to FIGS. 1-4. The method commences in frame 82 with commanding, via operator input to the vehicle control device, such as the steering wheel 52 or the disclosed mechanism 54 used to control input torque generation of the powerplant 28, a target dynamic response of the vehicle 10. After frame 82, the method advances to frame 84, where it includes regulating, via the controller 48, the vehicle subsystem 56 to adjust the actual dynamic response of the vehicle 10 to the operator input and facilitate the target dynamic response of the vehicle. Following frame 84, the method proceeds to frame 86, where the method includes detecting via at least one sensor, such as the sensors 58, 60, 62, 64, 66, and 68, the actual dynamic response of the vehicle 10 adjusted by the vehicle subsystem 56.

As described above with respect to FIGS. 1-4, in frame 86 the method may include detecting and communicating to the controller 48, via the first sensor 58, the rotating speed of the road wheels 30, 32; via the second sensor 60 the rate of the yaw of the vehicle body 14, such as during cornering; and via the third sensor 62, the velocity of ambient airflow 27 relative to the vehicle 10. As additionally described above, in frame 86 the method may also include detecting and communicating to the controller 48, via the fourth sensor 68, an angle of the steering wheel 52.

After frame 86, the method advances to frame 88, where it includes receiving, via the controller 48, a feedback signal from at least one of the sensors 58, 60, 62, 64, 66, and 68 indicative of the detected adjusted actual dynamic response of the vehicle 10. Following frame 88, the method advances to frame 90, where it includes determining, via the controller 48, a target position for the adjustable aerodynamic-aid element 44, relative to the vehicle body 14 using the detected adjusted actual dynamic response of the vehicle 10. As described above with respect to FIGS. 1-4 the adjustable aerodynamic-aid element 44 can be the spoiler 44A, the splitter 44B, the air dam 44C, the diffuser 44D, and the shutter 44E. Following frame 90, the method proceeds to frame 92, where the method includes regulating, via the controller 48, the mechanism 46 to set the target position of the adjustable aerodynamic-aid element 44 and thereby controlling the movement of the ambient airflow 27 relative the vehicle body 14 to achieve the target dynamic response of the vehicle 10.

As described above with respect to FIGS. 1-4, the controller 48 can regulate the mechanism 46 to achieve the target dynamic response of the vehicle 10 during vehicle cornering in response to the detected yaw rate and at least one of the detected rotating speed of the road wheels 30, 32 and the velocity of the ambient airflow 27. Such regulation of the mechanism 46 is intended to vary a magnitude of an aerodynamic downforce FD on the vehicle body 14 and control the detected yaw rate. Following frame 92, the method may loop back to any of the frames 82-88 to reassess feedback signals from any of the appropriate sensors to determine and set an updated target position for the adjustable aerodynamic-aid element 44.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system for controlling aerodynamics of a vehicle, wherein the vehicle includes a vehicle body arranged along a longitudinal axis and having a first vehicle body end configured to face oncoming ambient airflow, the system comprising:
    a vehicle control device configured to receive operator input for commanding a target dynamic response of the vehicle;
    a vehicle subsystem configured to adjust an actual dynamic response of the vehicle to the operator input, wherein the vehicle subsystem includes an active rear steer subsystem;
    an adjustable aerodynamic-aid element mounted to the vehicle body;
    a mechanism configured to vary a position of the adjustable aerodynamic-aid element relative to the vehicle body and thereby control a movement of the ambient airflow relative to the vehicle body;
    at least one sensor arranged on the vehicle and configured to detect the actual dynamic response of the vehicle adjusted by the vehicle subsystem; and
    a controller programmed to regulate the mechanism and configured to:
        receive a feedback signal from the at least one sensor indicative of the detected adjusted actual dynamic response of the vehicle;
        determine a target position for the adjustable aerodynamic-aid element using the detected adjusted actual dynamic response of the vehicle; and
        set the adjustable aerodynamic-aid element to the target position thereof via the mechanism to control the aerodynamics and achieve the target dynamic response of the vehicle.

2. The system according to claim 1, wherein the controller is additionally configured to regulate the vehicle subsystem to facilitate the target dynamic response of the vehicle.

3. The system according to claim 2, wherein the vehicle subsystem additionally includes one or more of an electronic limited-slip differential, an electric all-wheel-drive subsystem, a traction control subsystem, a stability control subsystem, a ride-height control subsystem, a spring rate control subsystem, a damping control subsystem, and an anti lock braking subsystem.

4. The system according to claim 1, wherein the vehicle includes a road wheel, wherein the detected adjusted actual dynamic response of the vehicle is yaw of the vehicle body, and wherein the at least one sensor is selected from:
    a first sensor configured to detect a rotating speed of the road wheel and communicate the detected rotating speed of the road wheel to the controller;
    a second sensor configured to detect a rate of the yaw of the vehicle body and communicate the detected yaw rate to the controller; and
    a third sensor configured to detect a velocity of ambient airflow relative to the vehicle and communicate the detected velocity of the ambient airflow to the controller.

5. The system according to claim 4, wherein the vehicle control device is a steering wheel, and wherein the at least one sensor includes a fourth sensor configured to detect an angle of the steering wheel and communicate the detected angle of the steering wheel to the controller.

6. The system according to claim 5, wherein the at least one sensor includes the first sensor, second sensor, and the third sensor, and wherein the controller is configured to regulate the mechanism to achieve the target dynamic response of the vehicle during vehicle cornering in response to the detected yaw rate and at least one of the detected rotating speed of the road wheel and velocity of the ambient airflow, to thereby vary a magnitude of an aerodynamic downforce on the vehicle body and control the detected yaw rate.

7. The system according to claim 6, wherein the vehicle includes a second vehicle body end opposite the first vehicle body end, and wherein the aerodynamic-aid element is positioned proximate one of the first vehicle body end and the second vehicle body end.

8. The system according to claim 7, wherein the controller is configured to vary the magnitude of the aerodynamic downforce generated by the aerodynamic-aid element on one of the first vehicle body end and the second vehicle body end via regulation of the mechanism.

9. A vehicle comprising:
    a vehicle body arranged along a longitudinal axis and having a first vehicle body end configured to face oncoming ambient airflow;
    a vehicle control device configured to receive operator input for commanding a target dynamic response of the vehicle;

a vehicle subsystem configured to adjust an actual dynamic response of the vehicle to the operator input wherein the vehicle subsystem includes an active rear steer subsystem;

an adjustable aerodynamic-aid element mounted to the vehicle body;

a mechanism configured to vary a position of the adjustable aerodynamic-aid element relative to the vehicle body and thereby control a movement of the ambient airflow relative to the vehicle body;

at least one sensor arranged on the vehicle and configured to detect the actual dynamic response of the vehicle adjusted by the vehicle subsystem; and a controller programmed to regulate the mechanism and configured to:
receive a feedback signal from the at least one sensor indicative of the detected adjusted actual dynamic response of the vehicle;
determine a target position for the adjustable aerodynamic-aid element using the detected adjusted actual dynamic response of the vehicle; and
set the adjustable aerodynamic-aid element to the target position thereof via the mechanism to control the aerodynamics and achieve the target dynamic response of the vehicle.

10. The vehicle according to claim 9, wherein the mechanism is configured to vary a position of the adjustable aerodynamic-aid element relative to the vehicle body to thereby control a movement of the ambient airflow relative to the vehicle body wherein the controller is additionally configured to regulate the vehicle subsystem to facilitate the target dynamic response of the vehicle.

11. The vehicle according to claim 10, wherein the vehicle subsystem additionally includes one or more of an electronic limited-slip differential, an electric all-wheel-drive subsystem, a traction control subsystem, a stability control subsystem, a ride-height control subsystem, a spring rate control subsystem, a damping control subsystem, and an anti lock braking subsystem.

12. The vehicle according to claim 9, wherein the vehicle includes a road wheel, wherein the detected adjusted actual dynamic response of the vehicle is yaw of the vehicle body, and wherein the at least one sensor is selected from:
a first sensor configured to detect a rotating speed of the road wheel and communicate the detected rotating speed of the road wheel to the controller;
a second sensor configured to detect a rate of the yaw of the vehicle body and communicate the detected yaw rate to the controller; and
a third sensor configured to detect a velocity of ambient airflow relative to the vehicle and communicate the detected velocity of the ambient airflow to the controller.

13. The vehicle according to claim 12, wherein the vehicle control device is a steering wheel, and wherein the at least one sensor includes a fourth sensor configured to detect an angle of the steering wheel and communicate the detected angle of the steering wheel to the controller.

14. The vehicle according to claim 13, wherein the at least one sensor includes the first sensor, second sensor, and the third sensor, and wherein the controller is configured to regulate the mechanism to achieve the target dynamic response of the vehicle during vehicle cornering in response to the detected yaw rate and at least one of the detected rotating speed of the road wheel and velocity of the ambient airflow, to thereby vary a magnitude of an aerodynamic downforce on the vehicle body and control the detected yaw rate.

15. The vehicle according to claim 14, wherein the vehicle includes a second vehicle body end opposite the first vehicle body end, and wherein the aerodynamic-aid element is positioned proximate one of the first vehicle body end and the second vehicle body end, and wherein the controller is configured to vary the magnitude of the aerodynamic downforce generated by the aerodynamic-aid element on one of the first vehicle body end and the second vehicle body end via regulation of the mechanism.

16. A method of controlling aerodynamics of a vehicle having a vehicle body arranged along a longitudinal axis and having a first vehicle body end configured to face oncoming ambient airflow, the method comprising:
commanding, via operator input to a vehicle control device, a target dynamic response of the vehicle;
regulating, via the controller, a vehicle subsystem to adjust an actual dynamic response of the vehicle to the operator input and facilitate the target dynamic response of the vehicle, wherein the vehicle subsystem includes an active rear steer subsystem;
detecting, via at least one sensor arranged on the vehicle, the actual dynamic response of the vehicle adjusted by the vehicle subsystem;
receiving, via the controller, a feedback signal from the at least one sensor indicative of the detected adjusted actual dynamic response of the vehicle;
determining, via the controller, a target position for the adjustable aerodynamic-aid element relative to the vehicle body using the detected adjusted actual dynamic response of the vehicle; and
regulating, via the controller, a mechanism to set the target position of the adjustable aerodynamic-aid element and thereby controlling a movement of the ambient airflow relative the vehicle body to achieve the target dynamic response of the vehicle.

17. The method according to claim 16, wherein the vehicle subsystem additionally includes one or more of an electronic limited-slip differential, an electric all-wheel-drive subsystem, a traction control subsystem, a stability control subsystem, a ride-height control subsystem, a spring rate control subsystem, a damping control subsystem, and an anti lock braking subsystem.

18. The method according to claim 16, wherein the vehicle includes a road wheel, and wherein the at least one sensor is selected from a first sensor, a second sensor, and a third sensor, further comprising:
detecting and communicating to the controller, via the second sensor, a rate of the yaw of the vehicle body;
detecting and communicating to the controller, via the first sensor, a rotating speed of the road wheel and/or, via the third sensor, a velocity of ambient airflow relative to the vehicle; and
regulating the mechanism to achieve the target dynamic response of the vehicle during vehicle cornering in response to the detected yaw rate and at least one of the detected rotating speed of the road wheel and velocity of the ambient airflow, to thereby vary a magnitude of an aerodynamic downforce on the vehicle body and control the detected yaw rate.

19. The method according to claim 18, wherein the vehicle control device is a steering wheel, and wherein the at least one sensor includes a fourth sensor, further comprising detecting and communicating to the controller, via the fourth sensor, an angle of the steering wheel.

20. The system according to claim 19, wherein the vehicle includes a second vehicle body end opposite the first vehicle body end, and wherein the aerodynamic-aid element is positioned proximate one of the first vehicle body end and the second vehicle body end, and wherein said regulating the mechanism varies a magnitude of the aerodynamic downforce generated by the aerodynamic-aid element on one of the first vehicle body end and the second vehicle body end.

* * * * *